No. 664,507. Patented Dec. 25, 1900.
W. F. SINGER.
PUMP.
(Application filed Nov. 1, 1899.)
(No Model.)
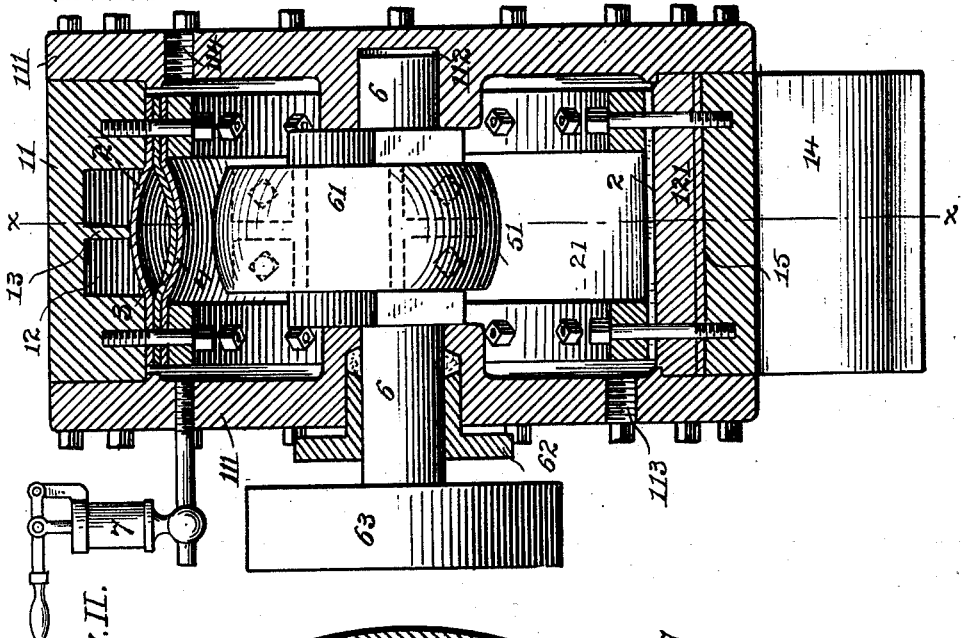
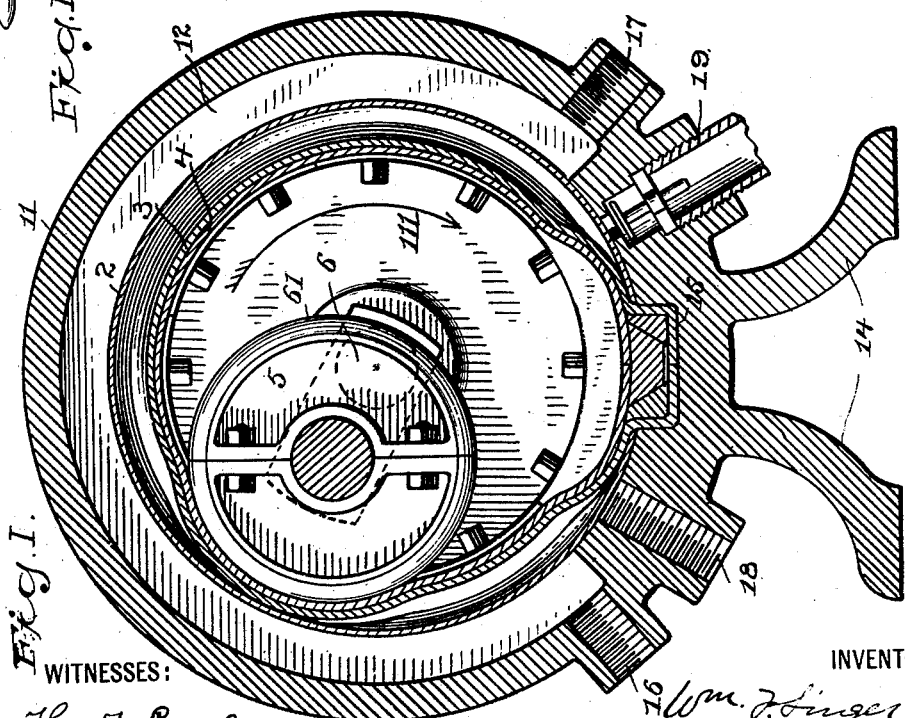
WITNESSES:
INVENTOR
BY
ATTORNEY

UNITED STATES PATENT OFFICE.

WILLIAM F. SINGER, OF NEW YORK, N. Y., ASSIGNOR TO THE AUTOMATIC ICE MACHINE COMPANY, OF NEW YORK.

PUMP.

SPECIFICATION forming part of Letters Patent No. 664,507, dated December 25, 1900.

Application filed November 1, 1899. Serial No. 735,504. (No model.)

*To all whom it may concern:*

Be it known that I, WILLIAM F. SINGER, a citizen of the United States, residing in the city, county, and State of New York, have invented a new and useful Improvement in Pumps, of which the following is a specification.

My invention relates to pumps in which the fluid is forced through a compressible tube by the action of a rotary portion. It particularly relates to pumps intended to compress gases into a liquid form. It is intended to improve such pumps in the direction of economy, both of construction and operation, and of durability.

In the accompanying drawings, Figure I represents in vertical section through the line $x\ x$, Fig. II, a pump embodying my invention. Fig. II is a central vertical section in a plane at a right angle with that of Fig. I.

1 designates a case consisting of cylinder 11, provided with internal groove 12, rib 13, feet 14, recess 15, and ports 16 17 18 19, and of ends 111, provided with bearings 112 and ports 113 114; 2, a plate or band grooved at 21; 3, a flexible sheet; 4, a protecting-sheet; 5, a roller having a convex face 51; 6, a shaft provided with crank 61, stuffing-box 62, and pulley 63, and 7, Fig. II, an auxiliary pump.

In the example of my invention illustrated the cylinder 11 of the case 1 may be of any desired dimensions. It has a circumferential interior groove 12, the ends of which communicate with ports 16 17, which will ordinarily be threaded or otherwise adapted to connection with a water-supply. A circumferential rib 13 bisects and serves to support the plate 2, as shown, in the groove 12. The case may conveniently be supported on feet 14. A recess 15 extends longitudinally of the cylinder 11 and preferably midway of the ends of the groove 12. Ports 18 19 extend through the wall of the cylinder 11 between the recess 15 and the ends of the groove 12. The port 19 may advantageously be provided with a valve, as shown in Fig. 1. The ends 111 of the case 1 are firmly bolted to the cylinder portion 11. These ends 111 are provided with bearings 112 for the shaft 6 and with ports 113 114, threaded, as shown, for connection with a water-supply. Bridging the groove 12 in the cylinder 11 is a plate or band 2, adapted to be bolted to the cylinder at each side of the groove and formed with a circumferential relatively shallow groove or depression 21 of substantially the same width as and seating in the groove 12. Bolted upon the inner face of the plate 2 are the sheets 3 and 4, the first of rubber cloth or other flexible and fluid-tight material and the second of canvas, leather, or any suitable wear-resisting fabric. These sheets 3 and 4 are adapted to fit closely down into the groove 21 in the plate 2 and to form with said groove when raised therefrom a circumferential tube extending nearly around the inner surface of the cylinder 11. The ends of the sheet 3 are within the recess 15 in the cylinder 11 and are there tightly held by suitable blocks and a wedge, as shown, or in any desired manner. The ends of the wear-resisting sheet 4 preferably abut, as shown, upon the block in the recess 15. A roller 5, whose face 51 is of a convexity corresponding to the concavity of the groove 21 in the plate 2, is mounted in a double crank 61 on a shaft 6, as shown. At least one end of the shaft 6 projects through a wall 111 of the case 1 and may have mounted on such projecting end a suitable pulley 63. A stuffing-box 62 secures a tight joint between the shaft 6 and case end 111. An auxiliary pump 7, exterior to the case 1, connects with the central open space in the case.

The operation of the device will be readily understood from an inspection of the drawings. It is clear that when the port 18 is connected with a body of fluid having head or pressure enough to inflate the tube formed by the rigid plate 2 and the flexible sheets 3 and 4 the rotation of the shaft 6 in the direction of the arrow in Fig. I will by a continuous and successive deflation of the tube force the fluid out through the port 19. To prevent injury to the rubber sheet 3 by contact therewith of oil in the cylinder, I sometimes find it advantageous to insert between this sheet 3 and the wear-resisting sheet 4 a sheet of oil-resisting material, as "patent-leather" or the like. When the pump is used for the compression of a gas or vapor into the liquid form, it is necessary to provide means for carrying off the heat of compression. By connecting the ports 16 and 17 with a flowing water-supply the space between the groove 12 in the cylinder 11 and the outer face of the plate 2, which forms one side of the pump-tube, is filled with water and the heat is rapidly carried away, especially from the plate 2. By further connecting the ports 113 and 114 with a water-supply the central space of the pump may be filled with water, which will also conduct heat from the sheets 4 and 3, which form the flexible side of the pump-tube. When the head or pressure of the fluid to be pumped is below atmospheric pressure, the ports 18 and 19 may be closed by means of valves (not shown in the drawings) and the air-pressure in the cylinder reduced to the desired extent by means of the auxiliary pump 7. The entering fluid will thus be enabled to inflate the pump-tube behind the roller 5, as before.

Among the many advantages of my invention the following may be named: (a) forming the compressible tube with its outer side of rigid material—i. e., making this outer side itself the plate against which the flexible inner side of the tube is compressed; (b) making this plate of concave form in combination with a compressing-roller having a convex face; (c) providing an outer cooling-space of which this outer rigid tube side forms the inner wall, the tube side, being of metal, readily conveying the heat of compression to the outer water-supply; (d) making this plate readily detachable, so that a thinner plate or one of better heat-conducting capacity—e. g., copper instead of steel—may be substituted when less strength is necessary or a more rapid cooling is desirable; (e) making the outer cooling-chamber directly in the shell of the pump, so that the entire body of the pump is kept relatively cool; (f) making the inner flexible side of the compressible tube of a flat sheet or sheets, thus saving the expense of a woven hose, preventing any cutting at the edges, and greatly facilitating repairs; (g) providing a second wear-resisting sheet to protect the fluid-tight inner sheet; (h) making these sheets readily removable, so that thinner or thicker ones or a greater number of sheets may be substituted as the inverse necessities for conductivity and strength vary; (i) supplying separate inner and outer cooling-chambers and making the flow of water through these separately controllable, and (j) providing means for reducing the atmospheric pressure on the flexible tube, so as to permit its easier inflation by the entering liquid.

It is clear that many mechanical alterations may be made in my device without departing from my invention.

What I claim is—

1. In a pump of the class described a compressible tube one side of which is flexible while the other side is a plate of metal or other heat-conducting material in combination with a liquid circulating and cooling chamber entirely separated from said tube of which chamber said plate forms a wall whereby the heat generated in compression may be conveyed to a liquid in said chamber, substantially as described.

2. In a pump of the class described a compressible tube one side of which is of rubber cloth or other fluid-tight flexible material while the other side is a plate of metal or other heat-conducting material in combination with a liquid circulating and cooling chamber entirely separated from said tube of which chamber said plate forms a wall whereby the heat generated in compression may be conveyed to a liquid in said chamber, substantially as described.

3. In a pump of the class described a compressible tube one side of which is of rubber cloth or other fluid-tight flexible material protected by an outer wear-resisting flexible fabric while the other side is a plate of metal or other heat-conducting material in combination with a liquid circulating and cooling chamber entirely separated from said tube of which chamber said plate forms a wall whereby the heat generated in compression may be conveyed to a liquid in said chamber, substantially as described.

4. In a pump of the class described a compressible tube one side of which is of rubber cloth or other fluid-tight flexible material protected by a covering-sheet of oil-tight flexible material while the other side is a plate of metal or other heat-conducting material in combination with a liquid circulating and cooling chamber entirely separated from said tube of which chamber said plate forms a wall whereby the heat generated in compression may be conveyed to a liquid in said chamber, substantially as described.

5. In a pump of the class described a compressible tube one side of which is flexible while the other side is a concave plate of metal or other heat-conducting material in combination with a liquid circulating and cooling chamber entirely separated from said tube of which chamber said plate forms a wall whereby the heat generated in compression may be conveyed to a liquid in said chamber, substantially as described.

6. In a pump of the class described a compressible tube one side of which is flexible while the other side is a detachable plate of metal or other heat-conducting material in combination with a liquid circulating and cooling chamber entirely separated from said tube of which chamber said plate forms a wall whereby the heat generated in compression may be conveyed to a liquid in said chamber, substantially as described.

7. In a pump of the class described in combination a compressible tube the inner side of which is flexible, rotary means for compressing said tube so as to force a fluid therethrough, an outer circulating and cooling chamber of which the outer rigid wall of said tube forms the inner wall and inlet and outlet ports connecting with said outer chamber, substantially as described.

8. In a pump of the class described in combination a compressible tube, rotary means for compressing said tube so as to force a fluid therethrough, an outer cooling-chamber surrounding said tube and a separate inner cooling-chamber surrounded by said tube, substantially as described.

9. In a pump of the class described in combination a compressible tube, rotary means for compressing said tube so as to force a fluid therethrough, an outer cooling-chamber surrounding said tube, a separate inner cooling-chamber surrounded by said tube said outer and inner chambers being each provided with inlet and outlet ports, substantially as described.

10. In a pump of the class described in combination a compressible tube, rotary means for compressing said tube so as to force a fluid therethrough, a closed chamber of which a flexible side of said tube forms a wall and means substantially as described for reducing the fluid-pressure in said chamber.

WILLIAM F. SINGER.

Witnesses:
 GEO. L. COOPER,
 CHARLES LEE.